(12) United States Patent
Shao

(10) Patent No.: US 8,321,873 B2
(45) Date of Patent: Nov. 27, 2012

(54) SYSTEM AND METHOD FOR OFFLINE DATA GENERATION FOR ONLINE SYSTEM ANALYSIS

(75) Inventor: Feng Shao, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 664 days.

(21) Appl. No.: 12/481,509

(22) Filed: Jun. 9, 2009

(65) Prior Publication Data
US 2010/0313205 A1    Dec. 9, 2010

(51) Int. Cl.
*G06F 9/46* (2006.01)
(52) U.S. Cl. .......................... 718/105; 707/600; 709/201
(58) Field of Classification Search .................. 718/105; 707/600; 709/201
See application file for complete search history.

(56) References Cited

U.S. PATENT DOCUMENTS

| | | | |
|---|---|---|---|
| 6,223,205 B1* | 4/2001 | Harchol-Balter et al. | 718/105 |
| 7,756,919 B1* | 7/2010 | Dean et al. | 709/201 |
| 7,917,463 B2* | 3/2011 | Dagum et al. | 707/600 |
| 2003/0093429 A1* | 5/2003 | Nishikawa et al. | 707/10 |
| 2007/0038659 A1* | 2/2007 | Datar et al. | 707/101 |
| 2008/0086442 A1* | 4/2008 | Dasdan et al. | 707/1 |
| 2010/0241828 A1* | 9/2010 | Yu et al. | 712/30 |
| 2010/0257198 A1* | 10/2010 | Cohen et al. | 707/770 |

OTHER PUBLICATIONS

Jeffrey Dean and Sanjay Ghemawat, MapReduce: Simplified Data Processing on Large Clusters, Communications of the ACM, Jan. 2008, vol. 51, No. 1, pp. 107-113.
U.S. Appl. No. 12/138,393, filed Jun. 12, 2008; 33 pages.

\* cited by examiner

*Primary Examiner* — Thomas Lee
*Assistant Examiner* — Xuxing Chen
(74) *Attorney, Agent, or Firm* — Berkeley Law & Technology Group, LLP

(57) ABSTRACT

The subject matter disclosed herein relates to a system and/or method offline data generation for online system analysis.

20 Claims, 5 Drawing Sheets

500

1: Sample (EventSet *events*, int *sampleFreq*, int *numReducer*, Value *min*, Value *max*,)
2: {Output: *Value* → *ReducerID*}
3:
4: {Use existing techniques to sample the input data and create 100* numReducer equal-width buckets}
5: numMicroBuckets ← 100 x numReducer
6: microBuckets ← CreateEqualWidthHistogram(events, sampleFreq, numMicroBuckets, min, max)
7:
8: {Now go over microBuckets and equalize events into the output mapping}
9: OutputMapping ← 0
10: step ← *microBuckets.totalNumEvents/numReducer*
11: {step is the number of events each reducer should process}
12: microIndex ← 0
13:
14: for ReducerID = 1 to numReducer do
15:     sum ← 0
16:     while sum < step do
17:         sum += microBuckets[microIndex++].numEvents;
    end while
19:     OutputMapping[microBuckets[microIndex].Value] ← ReducerID
20: end for
21:
22: return OutputMapping

FIG. 5

SYSTEM AND METHOD FOR OFFLINE DATA GENERATION FOR ONLINE SYSTEM ANALYSIS

BACKGROUND

1. Field

The subject matter disclosed herein relates to offline data generation for online system analysis.

2. Information

Online systems process real time web traffic with low latency and high throughput. For example, some online systems may handle up to 30 billion events every day. Prior to the full deployment of such online systems, the systems are frequently analyzed against the target capacity in a staging or test environment using a portion of the real time traffic or alternatively, offline data.

Real time traffic is not often made available to systems that are not in production, and even when it is, it is complicated to budget the traffic to accurately exercise the online systems. The real time traffic must be of the right quantity, so that the performance numbers are truly representative, and in the right quality, so that all possible execution scenarios are covered. In contrast, offline data are reliably archived in data warehouses, and are easily accessible. Furthermore, the offline data are pre-processed and well-formed, and may be conveniently tailored to satisfy different quantity and quality requirements.

BRIEF DESCRIPTION OF THE FIGURES

Non-limiting and non-exhaustive embodiments will be described with reference to the following figures, wherein like reference numerals refer to like parts throughout the various figures unless otherwise specified.

FIG. 5 is a pseudo-code listing suitable for implementing a process for evenly load balancing key/value pairs among reducer nodes of a MapReduce platform in accordance with an example embodiment.

DETAILED DESCRIPTION

Figure 1:
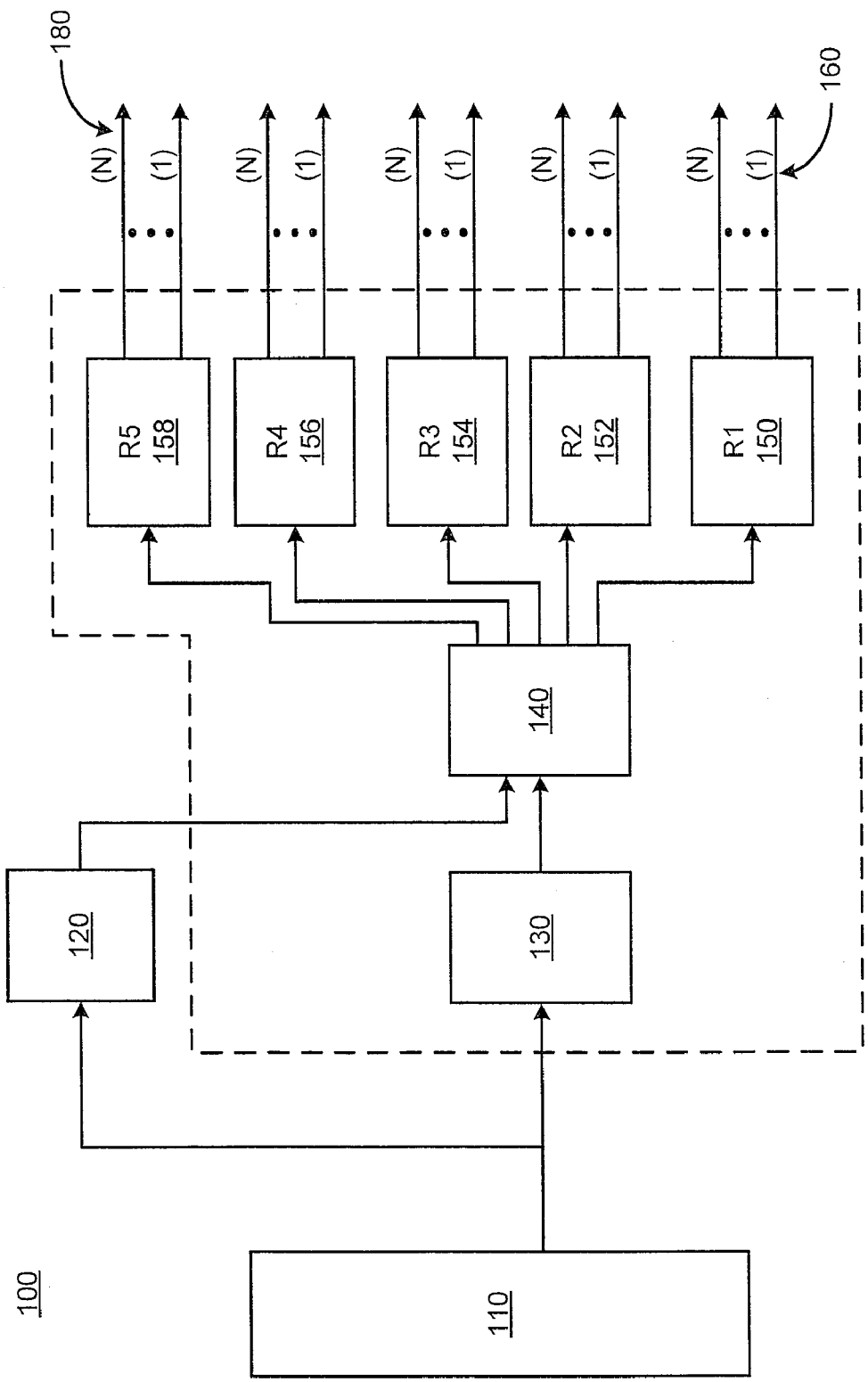
FIG. 1 is a schematic diagram illustrating the system architecture of an offline data generation system according to an example embodiment.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated.

For example, one or more portions of a memory device may store signals representative of data and/or information as expressed by a particular state of the memory device. In an implementation, an electronic signal representative of data and/or information may be "stored" in a portion of a memory device by affecting or changing the state of such portions of the memory device to represent data and/or information as binary information (e.g., ones and zeros). As such, in a particular implementation, such a change of state of the portion of memory to store a signal representative of data and/or information constitutes a transformation of a memory device to a different state or thing.

It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing," "computing," "calculating," "associating," "identifying," "determining," "allocating," "generating," and/or the like refer to the actions and/or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and," "and/or," and "or" as used herein may include a variety of meanings that will depend at least in part upon the context in which it is used. Typically, "and/or" as well as "or" if used to associate a list, such as A, B and/or C, is intended to mean A, B, and C, here used in the inclusive sense, as well as A, B or C, here used in the exclusive sense. Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments. Embodiments described herein may include machines, devices, engines, or apparatuses that operate using digital signals. Such signals may comprise electronic signals, optical signals, electromagnetic signals, or any form of energy that provides information between locations.

In particular embodiments, the use of offline data is not without its challenges. Such offline data should closely represent the real time traffic, and may exercise multiple system use cases. The offline data generation may also be efficient and scalable, so that it may be easily repeated for different system scales and data volumes. The offline data generation may also employ minimal development overhead to reduce the overall time-to-market of a particular system.

Embodiments described herein relate to, among other things, the generation of offline data for online system analysis. More particularly, and in certain example embodiments, advanced statistical methods are used to sample input events to determine a frequency distribution with respect to a key attribute of the input events. In some example embodiments the key attribute of the input events may be an event timestamp. In other example embodiments the key attribute of the input events may be an Internet Protocol (IP) address.

Based on the determined distribution relative to the chosen key attribute, particular embodiments may establish an ordered and balanced mapping from the key attribute to one or more processing nodes, such as one or more reducer nodes in a MapReduce framework. For example, if the key attribute of the input events is an event timestamp, timestamps assigned to the reducer node (i) are less than those assigned to reducer node (i+1), and substantially the same number of events are allocated to each reducer node. Thus, particular embodiments may use the obtained distribution to map events to reducer nodes based on their timestamps, and the distribution may evenly partition the workload among available reducer nodes in order to achieve load balancing and parallelization. Since timestamps assigned to reducer node (i) are less than the timestamps assigned to the reducer node (i+1), output files from the reducer nodes are automatically globally ordered. Thus, the expense of performing a global external sort is reduced or avoided by the particular embodiments. These and other principles of example embodiments are explained in greater detail below.

FIG. 1 is a schematic diagram illustrating a system architecture of an offline data generation system 100 according to an example embodiment. Offline data generation system 100 comprises a data sampler 120 and a MapReduce (MR) platform 125. MR platform 125 further includes a mapper node 130 and a partitioner node 140. In addition, MR platform 125 includes, in this particular illustrated instance, five processing nodes 150, 152, 154, 156, and 158. In other embodiments the number of mapper nodes, partitioner nodes, and processing nodes found in the MR platform 125 may be different from the number that are illustrated in FIG. 1. The five processing nodes 150, 152, 154, 156, 158 may also be referred to as reducer nodes R1, R2, R3, R4, and R5, respectively.

Data sampler 120 and mapper 130 of the MR platform 125 receive input data 110. Input data 110 may take any one of several forms. In some particular examples, for purposes of illustration, input data 110 may comprise an ASCII text file, or alternatively a binary data file. In an example embodiment, input data 110 are Yahoo! data warehouse feeds, which may be partitioned and stored in 512 files that are ordered and clustered by user IDs. Some non-limiting examples of Yahoo! data warehouse feeds are ads_octopus, which captures Yahoo! page views, ad views, and ad clicks; bt_search, which captures Yahoo! searches, and ult, which captures algorithmic search clicks and sponsored search clicks. It should be understood, however, that these are merely examples of input provided to a data sampler and mapper according to a particular embodiment for the purposes of illustration and that claimed subject matter is not limited in this respect. In any event, input data 110 may include key attributes that are associated with past real-time events. Key attributes may be, for example, an event timestamp, an IP address, or a User ID.

As mentioned above, input data 110 is input to both data sampler 120 and MR platform 125. Data sampler 120 is configured to sample input data 110 using statistical techniques, which will be described in further detail below. Generally speaking, data sampler 120 may generate a mapping 135 between at least one key attribute of input data 110 and one of the reducer nodes R1, R2, R3, R4, R5 such that events are substantially evenly distributed among the reducer nodes. This is known as load balancing. Mapping 135 generated by data sampler 120 is input to the partitioner node 140 of MR platform 125.

In one particular non-limiting embodiment, data sampler 120 may be invoked to generate a mapping 135 between event timestamps and the reducer nodes R1, R2, R3, R4, R5 such that reducer nodes receive substantially the same number of events and such that the events received by the five reducer nodes R1, R2, R3, R4, R5 have already been chronologically sorted relative to the other reducer nodes. That is, the chronologically earliest group of events may be mapped to the first reducer node R1 (150), the next earliest group of events may be mapped to the second reducer node R2 (154), and so forth, with the latest group of events being mapped to the fifth reducer node R5 (158).

Once the mapping 135 is obtained, input data 110 is fed into the MR platform 125 for data generation. The input of mapper node 130 may be keyed by line number, and the value is the content of each line, or in shorthand, {line number, content}. The output of mapper node 130 may be keyed by a selected key attribute of input data 110, such as event timestamp. Mapper node 130 may also transform the content of input data 110 according to different application needs. For example, in the Yahoo! Behavioral Targeting in Real Time (BTRT) system, mapper node 130 may filter out virtual space IDs. In any event, mapper node 130 may generate outputs that may be referred to as key value pairs, in which each key value pair takes the form of, in shorthand, {key attribute, transformed content}.

Key value pairs generated by the mapper node 130 are input to partitioner node 140, which as mentioned above also receives the mapping 135 from data sampler 120. Using mapping 135, partitioner node 140 substantially evenly distributes key value pairs to the reducer nodes R1-R5. It should be noted that in some cases it may be impossible to achieve a perfect event load distribution across the available reducer nodes. For example, the system 100 of FIG. 1 may not be able to achieve a perfectly optimal load distribution across the reducer nodes R1-R5 if the number of key value pairs is not perfectly divisible by five. However, because the number of key value pairs processed by MR platform 125 may be very large relative to the number of reducer nodes R1-R5, any variation in load across the reducer nodes may not significantly affect the performance.

Lastly, reducer nodes R1-R5 receive the key value pairs according to the distribution embodied by the mapping 135. As explained above, in the case where the key attribute is an event timestamp, key value pairs received by reducer nodes R1-R5 are already partially chronologically sorted across the five reducer nodes R1-R5. Any of the particular reducer nodes R1-R5 may then order the key value pairs and outputs such key value pairs in chronological order. No expensive global external sorting may be required after key value pairs are output from the reducer nodes R1-R5, as mapping 135 guarantees that the key value pair at output 160 of reducer node R1 is chronologically earliest and that the key value pair at output 180 of reducer node R5 is chronologically latest. Thus, the data output from the reducer nodes R1-R5 may immediately be put to use.

For a greater understanding of the operation of the MR platform 125, the reader is invited to refer to U.S. patent application Ser. No. [Insert Ser. No. for 070.P033], or to *MapReduce: Simplified Data Processing on Large Clusters* by Dean and Ghemawat, found in Communications of the ACM, January 2008/Vol. 51, No. 1; pgs. 107-113.

Figure 2:
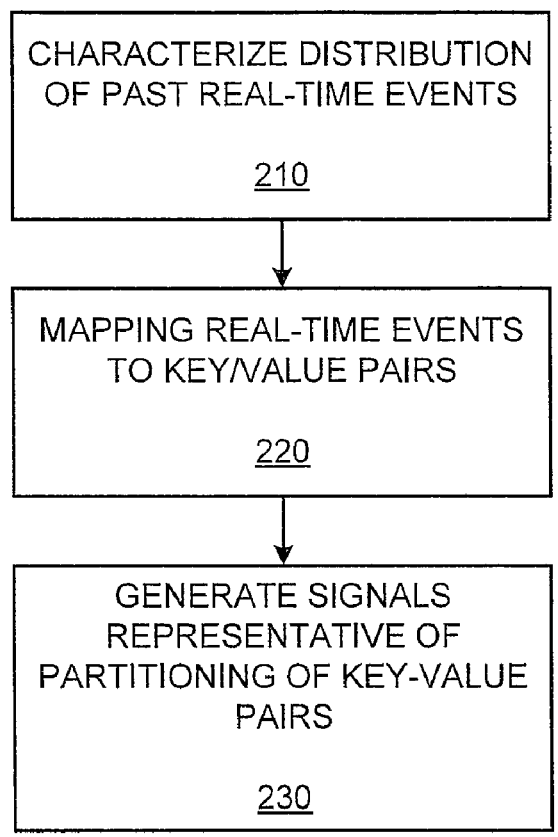
FIG. 2 is a flow diagram illustrating an offline data generation process according to an example embodiment.

FIG. 2 is a flow diagram illustrating an offline data generation process 200 according to an example embodiment. For example, FIG. 2 may illustrate some of the sub-processes that the offline data generation system 100 of FIG. 1 performs while operating in accordance with example embodiments, the details of which were explained in the discussion of FIG. 1.

Referring to FIG. 2, the offline data generation process 200 according to an example embodiment includes, but is not limited to, three sub-processes 210, 220, and 230. In sub-process 210, a distribution of past real-time events is obtained. In accordance with example embodiments and as explained above, this distribution is based, at least in part, upon at least one key attribute associated with the past real-time events. In some embodiments, the at least one key attribute includes an event timestamp associated with a real-time event. In other embodiments, the at least one key attribute may comprise an IP address associated with a real-time event. Again, these are merely examples of key attributes according to particular embodiments, and claimed subject matter is not limited in this respect.

Next, in sub-process 220, a mapping of real-time events to key value pairs occurs. As explained above, some goals of the mapping are to substantially evenly distribute the processing load across a plurality of available reducer nodes and to partially sort the key value pairs by the at least one key attribute. In embodiments where the at least one key attribute comprises an event timestamp, the mapping ensures that key/value pairs are at least partially chronologically sorted upon before being input to their respective reducer nodes.

Lastly, in sub-process 230, signals are generated that are representative of the partitioning of the key value pairs. Typically, these signals may be electrical digital signals, but other embodiments are not so limited. These signals may be used to change or transform the memory state of a memory to reflect the mapping that results from sub-process 220.

In the discussion of FIG. 1, it was explained how data sampler 120 may be configured to sample input data 110 using statistical techniques in order to generate a mapping 135 between at least one key attribute of input data 110 and one of the reducer nodes R1, R2, R3, R4, R5 such that the events are substantially evenly distributed among the reducer nodes. Accordingly, FIG. 3 is a graph 300 illustrating one such statistical technique for evenly load balancing key/value pairs across reducer nodes in accordance with an example embodiment.

Figure 3:
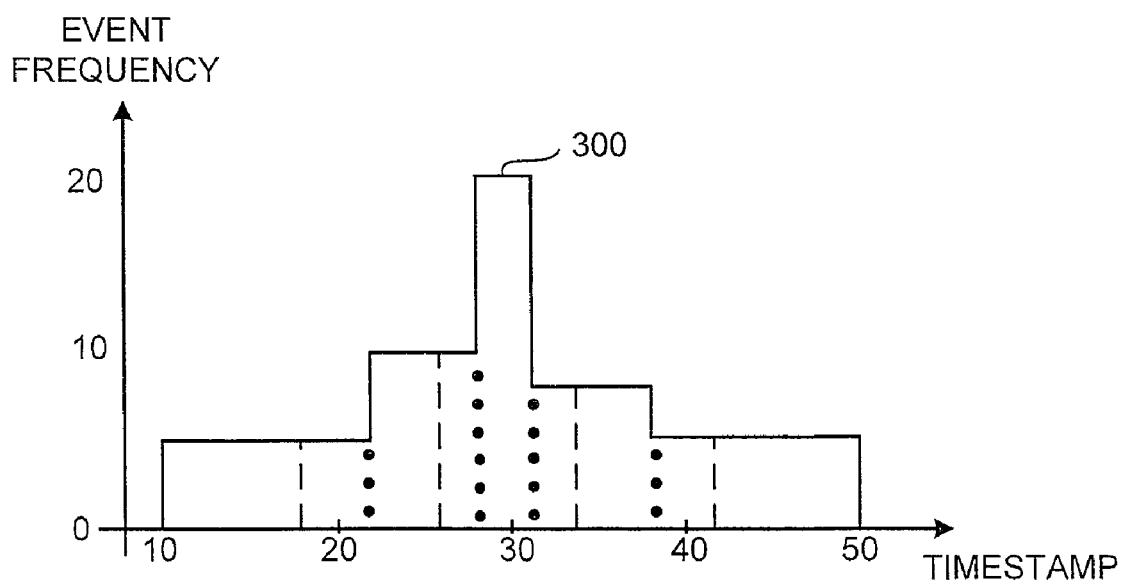
FIG. 3 is a graph illustrating a technique for evenly load balancing key/value pairs across reducer nodes according to an example embodiment.

Referring to FIG. 3, the graph 300 is a histogram representing event frequency according to a key attribute, and in particular, the key attribute is the event timestamp. Assuming that an offline data generation system had five reducer nodes R1-R5 like system 100 illustrated in FIG. 1, partitioner node 140 may assign the events of the histogram to one of the reducer nodes by simply dividing the histogram in five segments or "buckets" of the same width. That is, each one of the buckets covers the same amount of time. This partitioning of the histogram is indicated by the dashed lines located at, approximately, timestamp 18, timestamp 26, timestamp 34, and timestamp 42. However, it is apparent that simply dividing the histogram so that each bucket covers the same amount of time may result in some buckets being assigned many more events than others. For example, the middle bucket (between timestamps 26 and 34) has many more events than the two buckets at either end of the histogram 300. Thus, the middle bucket would suffer from extremely high load which, in turn, may slow down the entire process.

In order to load balance the events across the reducer nodes in accordance with an example embodiment, the histogram 300 may be partitioned in a manner such that the resulting buckets have substantially the same area. This partitioning of the histogram 300 is indicated by the dotted lines that appear, approximately, at timestamp 22, timestamp 28, timestamp 32, and timestamp 41. It is noticeable that, in this scenario, the five buckets defined by the dotted lines have approximately equal areas, therefore approximately the same number of events are associated with each bucket. Thus, in accordance with a particular example embodiment, key value pairs with event timestamps in the range of approximately 10-22 are assigned to the first reducer node R1, key value pairs with event timestamps of approximately 22-28 are assigned to the second reducer node R2, key value pairs with event timestamps in the range of approximately 28-32 are assigned to the third reducer node R3, key value pairs with event timestamps in the range of approximately 32-38 are assigned to the fourth reducer node R4, and key value pairs with event timestamps in the range of approximately 38-50 are assigned to the fifth reducer node R5. Partitioning the histogram 300 in this manner illustrates a technique that that may be referred to as histogram equalization, which for purposes of this disclosure may be defined as partitioning a distribution of real time events that are sorted by at least one key attribute such that the distribution of events is divided into a plurality of non-overlapping ranges equal to the number of available reducer nodes, where each of the ranges covers substantially the same number of events.

Figure 4:
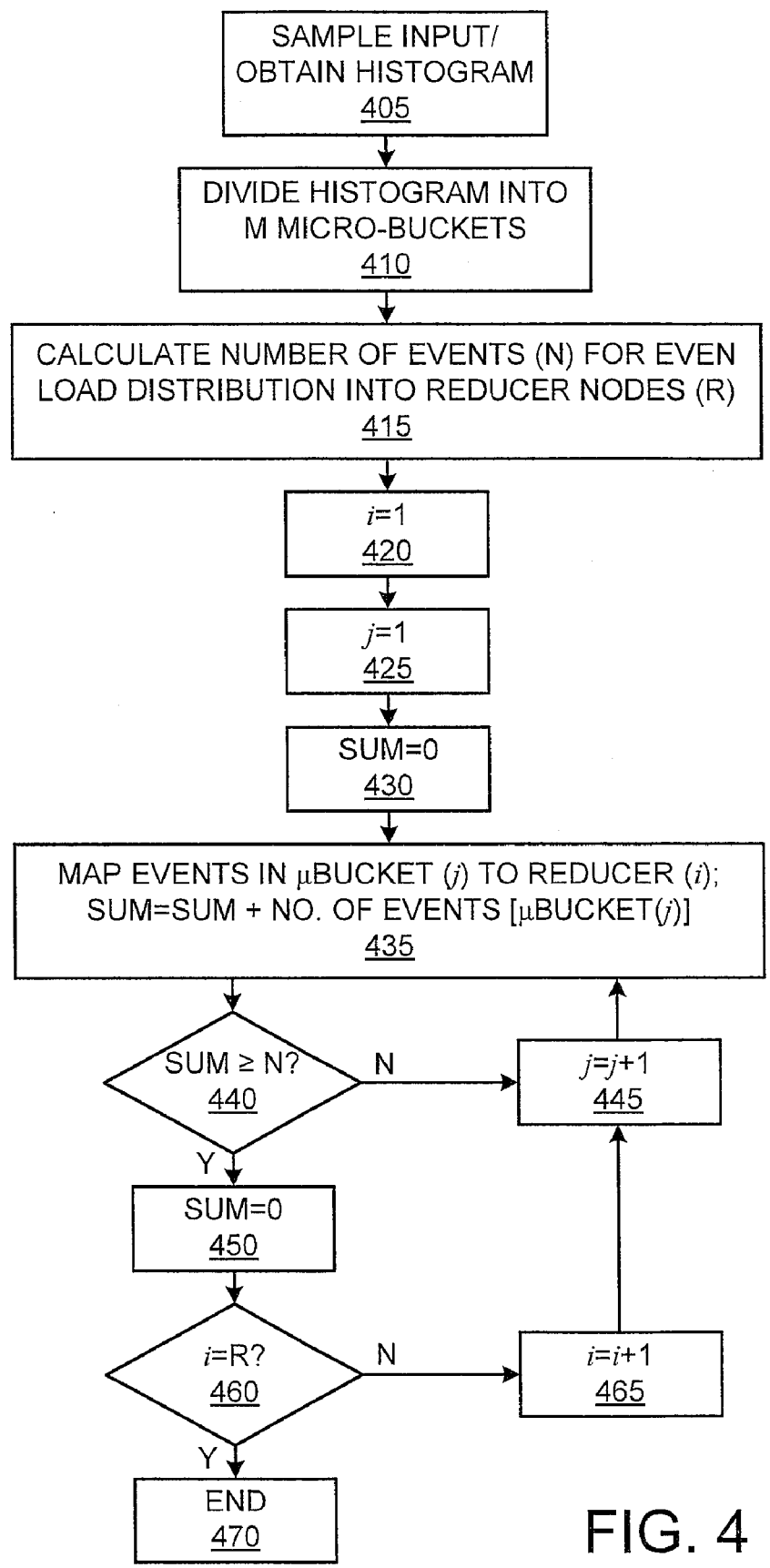
FIG. 4 is a flow diagram illustrating a process for evenly load balancing key/value pairs among reducer nodes of a MapReduce platform in accordance with an example embodiment.

FIG. 4 is a flow diagram illustrating a process 400 for load balancing key value pairs among reducer nodes of a MapReduce platform in accordance with an example embodiment. In particular, process 400 evenly load balances key value pairs using the histogram equalization technique described above.

Referring to FIG. 4, the process 400 begins in subprocess 405 with the sampling of input events based upon a selected key attribute, for example, an event timestamp, and obtaining a histogram of the input events based upon the sampling. In the case where the key attribute is an event timestamp, the histogram represents a frequency distribution of the input events based upon the event timestamps of the events.

Next, in subprocess 410, the histogram is divided into M segments, or microbuckets, of equal width. The microbuckets are preferably of a fine resolution, that is, the number of microbuckets M is preferably much larger than the number of reducer nodes R in the MapReduce platform. In one example embodiment, the number of microbuckets is selected such that $M=(100)(R)$.

Next, in subprocess 415, a calculation is performed to determine how many events N should be assigned to each of the reducer nodes R so that the events are distributed substantially evenly across all of the reducer nodes. As mentioned above, the calculation of the number of events N does not necessarily yield a whole number, but as a practical matter each of the reducer nodes R must be assigned a whole number of events. Thus, there may be minor variations in the number of events that each reducer node is assigned, but this variation is negligible in large datasets.

Next, in subprocesses 420, 425, and 430, the variables i, j, and SUM are set to initial values of 1, 1, and 0, respectively. The variable i is used as an index for the reducer nodes R, the variable j is used as an index for the microbuckets M, and the variable SUM is used to track the number of events that have been assigned to the reducer nodes, which will be explained in greater detail below.

Process 400 continues with subprocess 435, where, beginning with microbucket (j), each of the events that are found in microbucket (j) is mapped or assigned to reducer (i). In subprocess 435 the variable SUM is also incremented by the number of events that occur in microbucket (j).

In subprocess 440, the determination is made as to whether the variable SUM is greater than or equal to the number of events N that may be assigned to each of the reducer nodes for substantially even load distribution. If this determination is negative, it means that reducer (i) has not yet been assigned the appropriate number of events, the microbucket index j is incremented by one in subprocess 445, and the process returns to subprocess 435, where events from microbucket (j+1) may be then assigned to reducer (i), and so forth. If it is instead determined at subprocess 440 that the number of events assigned to reducer (i) is greater than or equal to N, this means that the current reducer is full. In this case, the variable SUM is reset to zero at subprocess 450 so that SUM may be used to accurately track the number of events that are assigned to the next reducer, or reducer (i+1).

In subprocess 460, the determination is made as to whether there are any more reducers left to assign events to. This may be done by comparing the reducer index (i) to the number of reducer nodes R. If the comparison is true, then the last reducer node has been assigned N events and the process 400 ends at subprocess 470. If the comparison is false, then there still remain additional events to be assigned to the remaining reducer nodes. Subsequently, the reducer node index (i) is incremented by one at subprocess 465, and the microbucket index (j) is incremented by one at subprocess 445 before the process 400 returns to subprocess 435 where events may begin to be assigned to the next reducer node, or reducer (i+1).

As described above, the process 400 uses M equal-width segments to initially partition the histogram, but the mapping that is produced nevertheless results in R reducer nodes being assigned approximately the same number of N events. Put another way, the end result of the mapping is that the R reducer nodes are assigned events from a variable number of microbuckets such that a total number of events N assigned to the R reducer nodes is substantially the same.

Those of skill in the art may recognize that the process 400 illustrated in FIG. 4 may be implemented in a variety of ways, for example, with nested "for" loops or "if, when" statements in a software environment. Those of skill in the art may also recognize that it is possible to rearrange the sub-processes included in process 400 slightly or combine subprocesses without departing from illustrated principles.

FIG. 5 is a pseudo-code listing 500 descriptive of a process for evenly load balancing key value pairs among reducer nodes of a MapReduce platform in accordance with an example embodiment. Referring to listing 500, the input arguments (line 1) are self-explanatory, note that the min and max can be easily obtained using the UNIX "sort" utility.

In lines 4-6, a large number of microbuckets may be created to understand the data distribution or histogram at a fine resolution. Microbuckets are of equal width, that is, each microbucket covers a range that has a span substantially the same as a range covered by any other microbucket, while any particular microbucket may contain a different number of data points, which represents the skewness of the underlying data.

Data points found in the equal-width microbuckets may then be assigned to reducer nodes (lines 8-20) such that the number of data points assigned to each reducer node is substantially the same. Here, particular reducer nodes may be checked to determine that they contain the same number of events, which is represented by the value of step (line 10). In the pseudo-code listing 500, Reducer ID (lines 14 and 19) may be used as an index for accessing the particular reducer nodes individually.

The system architecture, methods, and techniques according to the several example embodiments described above represent a scalable, efficient, and systematic approach that combines data warehousing technology, MapReduce technology, and advanced statistical techniques to generate offline data for accurate online system analysis. The advantages to such an approach are numerous. For instance, the offline data that is generated closely resembles real-time web traffic because the data warehouse feeds (input data) are derived from the real-time traffic. The MapReduce platform is a proven and widely adopted scalable platform. Optimal load balancing is achieved, hence the overall processing time is minimal. Furthermore, as described above, the offline data that is generated is globally ordered upon being output from the reducer nodes, so the need for an expensive global sorting is eliminated.

Additionally, the example embodiments illustrated above are insensitive to the skewness of the underlying data, and are capable of evenly distributing the offline data to each and every reducer node. The techniques described above are also flexible and easily generalized. While the examples embodiments described above focused on the chronological ordering of the offline data in the case where the event timestamps are used as the key attribute, the example embodiments may be easily adapted to generate data in any application-specific order. All that would be needed is a new sample function using a different key attribute, and a new mapping between the key attribute and the reducer nodes.

Figure 6:
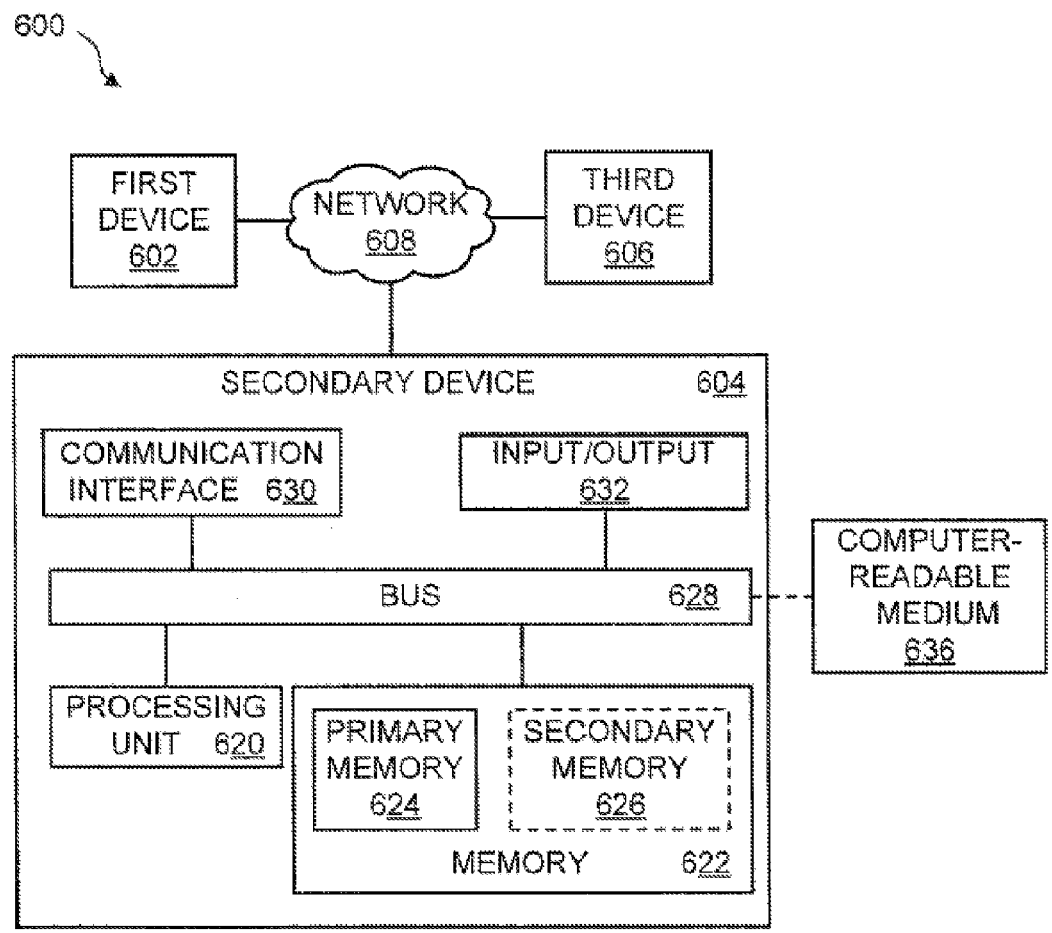
FIG. 6 is a schematic diagram of a computing environment suitable for hosting an offline data generation process according to an example embodiment.

FIG. 6 is a schematic diagram illustrating an example embodiment of a special purpose computing system 600 that may include one or more devices configurable to execute all or a portion of an offline data generation process using one or more techniques illustrated above, for example. In a particular example, although claimed subject matter is not limited in this respect, such an offline data generation process may be implemented to process queries or requests that are received from devices coupled to network 608. System 600 may include, for example, a first device 602, a second device 604 and a third device 606, which may be operatively coupled together through the network 608.

Special purpose computing system 600 may also be used to implement the offline data generation system 100 shown in FIG. 1. In a particular example embodiment, the functionality of the data sampler 120 and the MR platform 125 of the offline data generation system 100 may be centrally implemented by the processing unit 620 of the secondary device 604 by executing instructions stored in the primary memory 624. According to other embodiments, the functionality of the offline data generation system 100 may be distributed across multiple ones of the first, second, and third devices 602, 604, and 606 that are linked by the network 608. For instance, the secondary device 604 may implement the functionality of the data sampler 120, while the first device 602 may implement the functionality of the MR platform 125. These examples are presented for purposes of illustration and not for limitation, thus the claimed subject matter is not so limited.

First device 602, second device 604 and third device 606, as shown in FIG. 6, may be representative of any device, appliance or machine that may be configurable to exchange data over network 608. By way of example but not limitation, any of first device 602, second device 604, or third device 606 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 608, as shown in FIG. 6, is representative of one or more communication links, processes, and/or resources configurable to support the exchange of data between at least two of first device 602, second device 604, and third device 606. By way of example but not limitation, network 608 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 606, there may be additional like devices operatively coupled to network 608.

It is recognized that all or part of the various devices and networks shown in system 600, and the processes and methods as further described herein, may be implemented using or otherwise include hardware, firmware, software, or any combination thereof.

Thus, by way of example but not limitation, second device 604 may include at least one processing unit 620 that is operatively coupled to a memory 622 through a bus 628.

Processing unit 620 is representative of one or more circuits configurable to perform at least a portion of a data computing procedure or process. By way of example but not limitation, processing unit 620 may include one or more processors, controllers, microprocessors, microcontrollers, application specific integrated circuits, digital signal processors, programmable logic devices, field programmable gate arrays, and the like, or any combination thereof.

Memory 622 is representative of any data storage mechanism. Memory 622 may include, for example, a primary memory 624 and/or a secondary memory 626. Primary memory 624 may include, for example, a random access memory, read only memory, etc. While illustrated in this example as being separate from processing unit 620, it should be understood that all or part of primary memory 624 may be provided within or otherwise co-located/coupled with processing unit 620.

Secondary memory 626 may include, for example, the same or similar type of memory as primary memory and/or one or more data storage devices or systems, such as, for example, a disk drive, an optical disc drive, a tape drive, a solid state memory drive, etc. In certain implementations, secondary memory 626 may be operatively receptive of, or otherwise configurable to couple to, a computer-readable medium 628. Computer-readable medium 636 may include, for example, any medium that can carry and/or make accessible data, code and/or instructions for one or more of the devices in system 600.

Second device 604 may include, for example, a communication interface 630 that provides for or otherwise supports the operative coupling of second device 604 to at least network 608. By way of example but not limitation, communication interface 630 may include a network interface device or card, a modem, a router, a switch, a transceiver, and the like.

Second device 604 may include, for example, an input/output 632. Input/output 632 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 632 may include an operatively configured display, speaker, keyboard, mouse, trackball, touch screen, data port, etc.

It should also be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although the claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

While there have been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising:
executing instructions by a special purpose computing apparatus to:
characterize a distribution of past real-time events in one or more electrical digital signals representing the past real-time events based, at least in part, on at least one key attribute associated with said past real-time events;
map the past real-time events to key value pairs;
order the key value pairs according to the at least one key attribute; and generate one or more electrical digital signals representative of a partitioning of the key-value pairs among a plurality of reducer nodes based, at least in part, on the distribution.

2. The method of claim 1, further comprising further executing the instructions by the special purpose computing apparatus to partition the key-value pairs among the plurality of reducer nodes by performing a histogram equalization.

3. The method of claim 2, wherein performing the histogram equalization comprises allocating events among the reducer nodes to substantially load balance the reducer nodes according to the distribution.

4. The method of claim 1, in which the at least one key attribute comprises an event timestamp.

5. The method of claim 4, and further comprising executing the instructions by the special purpose computing apparatus to partition the key-value pairs among the plurality of reducer nodes.

6. The method of claim 1, in which the at least one key attribute comprises an Internet Protocol (IP) address.

7. The method of claim 6, in which partitioning the key value pairs comprises mapping the IP addresses of the past real time events to a selected one of the reducer nodes.

8. An article comprising: a non-transitory computer readable medium comprising instructions stored thereon which are executable by a special purpose computing apparatus to:
map input data associated with past real-time events to key-value pairs;
order the key value pairs according to at least one key attribute; and
partition the key-value pairs among a plurality of reducer nodes based, at least in part, on a distribution of the past real-time events according to the at least one key attribute.

9. The article of claim 8, wherein the instructions are further executable by the special purpose computing apparatus to transform the content of the input data to create output data having a transformed content that is tailored for the analysis of the online system, in which the output data is keyed according to the key attribute of the past real-time event.

10. The article of claim 9, wherein the instructions are further executable by the special purpose computing apparatus to:
distribute the output data evenly among the reducer nodes based upon the mapping; and
order the output data based upon the key attribute.

11. The article of claim 10, wherein the instructions are further executable by the special purpose computing apparatus to output the output data from each of the reducer nodes such that the output data is globally sorted across all of the reducer nodes.

12. The article of claim 11, wherein ordering the output data based upon the key attribute comprises ordering the output data based upon the timestamps of the past real-time events.

13. The article of claim 11, in which ordering the output data based upon the key attribute comprises ordering the output data based upon the Internet Protocol (IP) addresses of the past real-time events.

14. A special purpose computing apparatus comprising:
one or more processors programmed with instructions to:
map past real time events contained in input data to key-value pairs;
order the key value pairs according to at least one key attribute; and
partition the key-value pairs among a plurality of reducer nodes based, at least in part, on a distribution of the past real-time events according to the at least one key attribute.

15. The special purpose computing apparatus of claim 14, the one or more processors further programmed with instructions to transform a content of the input data into a transformed content that is tailored for the analysis of an online system, and with instructions to generate output data that includes the transformed content.

16. The special purpose computing apparatus of claim 15, the one or more processors further programmed with instructions to distribute the output data to the plurality of reducer nodes in accordance with the mapping.

17. The special purpose computing apparatus of claim 16, in which the mapping is capable of ensuring that the output data that is distributed to the plurality of reducer nodes is partially sorted according to the key attribute such that the output data provided to any one of the plurality of reducer nodes is sorted relative to any other one of the plurality of reducer nodes.

18. The special purpose computing apparatus of claim 17, the one or more processors further programmed with instructions to order the output data such that the one or more reducer nodes output globally sorted data.

19. The special purpose computing apparatus of claim 17, in which the mapping is capable of ensuring that the output data that is delivered to the one or more reducer nodes is partially sorted according to timestamps of the past real-time events such that the output data provided to any one of the plurality of reducer nodes is chronologically sorted relative to any other one of the plurality of reducer nodes.

20. The special purpose computing apparatus of claim 19, the one or more processors further programmed with instructions to further order the output data according to timestamps of the past real-time events such that the plurality of reducer nodes output completely chronologically sorted data.

* * * * *